United States Patent [19]
Guillot et al.

[11] 3,755,347
[45] Aug. 28, 1973

[54] CERTAIN N-THIAZOLYL-UREAS

[76] Inventors: Jean Claude Guillot, Eauboone; Pierre Poignant, Lyon; Jacques de Bazelaire de Lesseux, Rueilmalmaison, all of France

[22] Filed: July 20, 1970

[21] Appl. No.: 63,970

Related U.S. Application Data

[62] Division of Ser. No. 540,192, April 15, 1966, Pat. No. 3,551,442.

[30] Foreign Application Priority Data
Apr. 6, 1965   France .............................. 6512116

[52] U.S. Cl.......................................... 260/306.8 R
[51] Int. Cl............................................ C07d 91/34
[58] Field of Search ............................. 260/306.8 R

[56]       References Cited
           UNITED STATES PATENTS
2,755,285   7/1956   O'Neill et al. ................... 260/306.8

FOREIGN PATENTS OR APPLICATIONS
14,593   10/1963   Japan .............................. 260/306.8

OTHER PUBLICATIONS
Degering, An Outline of Organic Nitrogen Compounds, (Michigan, 1950), p. 438.

Primary Examiner—Richard J. Gallagher
Attorney—McDougall, Hersh, Scott and Ladd

[57]           ABSTRACT
A thiazole derivative having the general formula

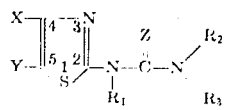

and pesticidal compositions containing the same.

2 Claims, No Drawings

CERTAIN N-THIAZOLYL-UREAS

CROSS-REFERENCE TO RELATED APPLICATION

This is a division of Ser. No. 540,192, which was filed upon Apr. 15, 1966 and is now U.S. Pat. No. 3,551,442.

This invention relates to a new family of compounds which are derivatives of thiazole and it relates also to the use of the thiazole derivatives as pesticides and especially as herbicides.

It is an object of this invention to produce and to provide a method for producing thiazole derivatives of the type described and the use of such thiazole derivatives as a pesticide and/or a herbicide.

The thiazole derivatives embodying features of this invention may be characterized by the formula

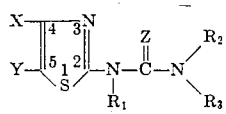

in which X and Y are groups which may be identical one with the other or different from each other. X and Y are representative of such groups as hydrogen, halogen such as chlorine, bromine, iodine, thiocyanate, —CN, — COOH, an alkoxycarbonyl group, — $NH_2$, —OH, a hydroxyalkyl, alkyl or alkoxy group containing from 1 to 4 carbon atoms such as methyl, ethyl, propyl, butyl, ethoxy, methoxy and the like in which the hydroxyalkyl, alkyl or alkoxy group can be unsubstituted or substituted with a halogen, an aryl group such phenyl, naphtyl, a halogenated aryl group, an alkaryl group such as benzyl, tolyl and the like, an alkoxy aryl group, a halogenated alkaryl group, a halogenated alkoxyaryl group, an aryloxy group, a halogenated aryloxy group and an alkaryloxy group ; in which Z is an atom selected from the group consisting of oxygen and sulphur ; in which $R_1$ is a group such as hydrogen or an alkyl, alkynyl, alkoxy, alkenyl or alkenoxy group having from 1 to 4 carbon atoms, an alkylated acyl residue, a halogenated alkylated acyl residue, an aracyl, a halogenated aracyl (arylated acyl), an alkarylated acyl, or an alkoxy- aryl acyl group ; in which $R_2$ and $R_3$ is a group selected from hydrogen, an alkyl group, an alkoxy group, an alkenyl group, an alkenoxy group or an alkynyl group in which the groups contain from 1 to 4 carbon atoms, an alkaryl residue, a halogenated alkaryl residue, an aryl group, a halogenated aryl group or an aryloxy group but in which $R_2$ and $R_3$ are not both hydrogen in the same compound.

The compounds defined above, which fall within the scope of the invention, may be prepared by a number of synthetic methods depending somewhat upon the nature of the groups $R_1$, $R_2$ and $R_3$.

The following will set forth typical examples of methods for the preparation of such compounds:

1. When two of the three radicals $R_1$, $R_2$ or $R_3$ are hydrogen, for example when $R_1$ and $R_3$ are hydrogen while $R_2$ is an alkyl group, aryl group, or alkaryl group, a halogenated alkaryl group or a halogenated aryl group, two methods of preparation can be employed:

a. The reaction of an alkyl or aryl isocyanate or isothiocyanate with a 2-aminothiazole in which X and Y are substituted groups, as illustrated in the following equation:

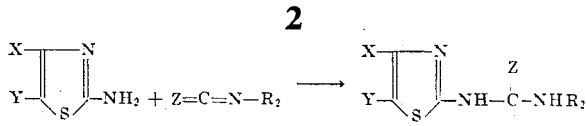

b. The reaction of a monosubstituted carbamyl or thiocarbamyl halide, in which the halogen is preferably chlorine, with a 2-aminothiazole in the presence of an agent which binds the acid liberated during the reaction, in accordance with the equation:

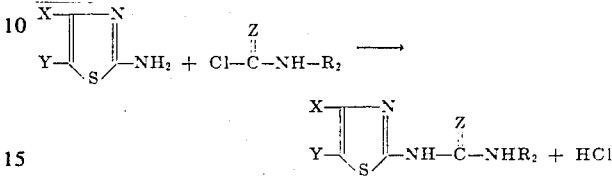

2. When only one of the three radicals $R_1$, $R_2$ and $R_3$ is hydrogen, such as when $R_1$ is hydrogen and $R_2$ and $R_3$ represent one of the groups of alkyl, aryl, alkaryl, halogenated alkaryl or halogenated aryl groups, the following process may be employed for the preparation.

A carbamyl or thiocarbamyl halide, preferably the chloride, in which $R_2$ and $R_3$ have the meaning given above, is reacted with a suitably substituted 2-aminothiazole in the presence of an agent that takes up the acid liberated according to the equation:

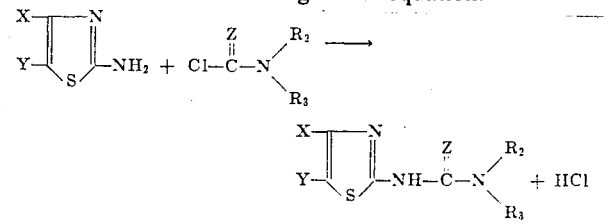

3. When $R_1$ is one of the groups selected from an alkylated acyl, halogenated alkylated acyl, arylacyl, halogenated arylacyl, alkylated arylacyl and alkoxylated arylacyl and when $R_2$ and $R_3$ are selected from one or more of the groups of hydrogen, alkyl, aryl, alkaryl, halogenated aryl or halogenated alkaryl except that $R_2$ and $R_3$ cannot both be hydrogen in the same compound, the following may be employed:

The alide of an aliphatic or aromatic acid, preferably the chloride $R_1Cl$, is reacted with thiazolyl or the thiazolylthiourea derivative prepared in accordance with method (1) or (2), as illustrated by the following equation:

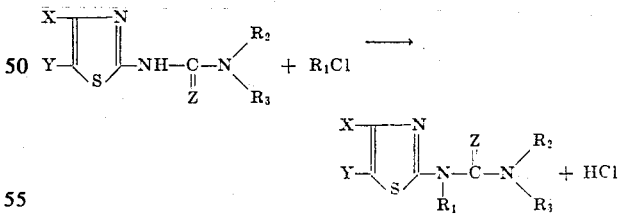

In the reaction outlined above, in which an acid is formed with an active hydrogen atom, it is preferred to carry out the reactions in the presence of an acid acceptor like a tertiary amine such as triethylamine, dimethylaniline or pyridine.

The derivatives of thiazolylurea or thiazolylthiourea are generally solids which are readily soluble in organic solvents such as dimethyl sulfoxide (DMSO), dimethylformamide, pyridine, tetrahydrofuran and $CH_3CN$.

The following compounds are given by way of illustration, but not by way of limitation, of the formulations representing compounds of this invention:

N-(2-thiazolyl)-N'-methylurea;
N-(2-thiazolyl)-N', N'-dimethylurea;

N-(2-thiazolyl)-N'-methyl-N'-methoxyurea;
N-(2-thiazolyl)-N'-phenylurea;
N-(2-thiazolyl)-N'-methyl-N'-propenylurea;
N-(2-thiazolyl)-N -benzoyl-N', N'-dimethylurea;
N-(2-thiazolyl)-N-methyl-N'-phenoxyurea;
N-(2-thiazolyl)-N-butenyl-N'-ethylurea;
N-(2-thiazolyl)-N-trichloroacetyl-N'-butylurea;
N-2(5-chlorothiazolyl)-N',N'-dimethylurea;
N-2(5-chlorothiazolyl)-N'-methylurea;
N-2(5-chlorothiazolyl)-N'-methylthiourea;
N-2(5-chloro-4-methylthiazolyl)-N'-phenylurea;
N-2(5-chloro-4-methylthiazolyl)-N'-methylurea;
N-2(5-chloro-4-methylthiazolyl)-N',N'-dimethylurea;
N-2(4,5-dichlorothiazolyl)-N'-methylurea;
N-2(4,5-dichlorothiazolyl)-N,N'-dimethylurea;
N-2(4-trifluoromethylthiazolyl)-N'-methyl-N'-methoxyurea;
N-2(4-trifluoromethylthiazoyl)-N'-methylurea;
N-2[4(2-chloro-ethyl)thiazolyl]-N'-ethylurea;
N-2(5-bromothiazolyl)-N'-butynylurea;
N-2(4-chlorothiazolyl)-N'-methylurea;
N-2(4-chlorothiazolyl)-N',N'-dimethylurea;
N-2(4-chlorothiazolyl)-N-monochloroacetyl-N'-methyl-N'-phenylurea;
N-2(4-chloromethylthiazolyl)-N',N'-dimethylurea;
N-2(4-chloromethylthiazolyl)-N'-methylurea;
N-2(5-thiocyanatothiazolyl)-N'-methylurea;
N-2(4-phenyl-5-thiocyanatothiazolyl)-N'-propenylurea;
N-2(5-carbethoxy-4-methylthiazolyl)-N'-methylurea;
N-2(4-2-hydroxyethylthiazolyl)-N'-(2,4-dichlorophenoxy)urea;
N-2(4-methylthiazolyl)-N'-methylurea;
N-2(4-methylthiazolyl)-N',N'-dimethylurea;
N-2(5-methylthiazolyl)-N'-phenylurea;
N-2(5-methylthiazolyl)-N'-methylurea;
N-2(5-methylthiazolyl)-N',N'-dimethylurea;
N-2(4-methylthiazolyl)-N'-methyl-N'-methoxyurea;
N-2(4,5-dimethylthiazolyl)-N'-methylurea;
N-2(4,5-dimethylthiazolyl)-N',N'-dimethylurea;
N-2(4-methoxy-5-chlorothiazolyl)-N-acetyl-N'-propenylurea;
N-2(4-p-chlorophenylthiazolyl)-N-methyl-n',N'-dimethylurea;
N-2(4-p-chlorophenylthiazolyl)-N'-methylurea;
N-2(4-p-methoxyphanylthiazolyl)-N'-tolyurea.

The compounds described have been found to have exceptional herbicidal properties. For this purpose, they find widespread application for inhibiting the growth or even destroying of all kinds of plants, pests, such as weeds, brushwood and undesirable shrubbery.

The amount of the compound required to achieve the desired herbicidal effect will depend upon a number of factors such as the nature of the compound itself, the resistance of the species of plants, the composition of the ground, the state of growth of the plant at the time that treatment is effected and finally upon the destruction desired to be effected, that is, a complete kill or only a selective kill.

The compounds may thus be employed as a total herbicide or as a selective herbicide or as a growth regulator. There is a wide range of possible applications depending upon the chemical nature and dosage of the herbicidal compound utilized. The compounds may be applied either prior to the seeding or planting of the cultures or application can be made as pre-emergence treatment after seeding but before the cultures or weeds break through the ground or as a post-emergence treatment after the plants break through the ground. In general, the compounds may be applied at any stage of plant growth best adapted to the problem to be solved and the nature of the cultivated plants.

In practice, the substituted thiazolylureas or thiazolylthioureas of the present invention are utilized in amounts within the range of 0.1 to 30 kilograms per hectare and preferably within the range of 0.5 to 20 kilograms per heactare. The optimum dosage will depend upon the intended aim, the type of application, the nature of the plant pests intended to be destroyed and their stage of growth and upon the persistence of the desired herbicidal action.

An interesting property of certain of the thiazolylureas and thiazolylthioureas of this invention resides in the persistence of their herbicidal action. Compounds of the type described, when suitably formulated, remain effective to prevent weed growth from several weeks to several months. This effectiveness over a long period of time is a very desirable feature of the compounds of this invention since weed control can be maintained throughout the growing season.

Another surprising property of the compounds of this invention is the highly specific character of their action on vegetation. When applied in proper dosages, the compounds are effective to destroy certain weeds which are dicotyledoneae without damaging other cultivated species of dicotyledoneae. Weed plants belonging to the graminaceae family may be destroyed in cereal cultures like wheat, barley, oats and Indian corn, without harming such cultures. The thiazolylureas and thioureas of this invention may be employed alone or in mixtures such as solutions in organic solvents, or as dispersions or emulsions of the oil-in-water or water-in-oil types or as suspensions in aqueous medium. They may be formulated into pastes or mixed with powders for dusting or they may be applied as granules in mixtures containing talcum, kaolin, or other suitable filler.

Such solutions, dispersions, pastes, powders or granules may be formulated to contain different proportions of the active component depending upon the intended use. As previously described, such compositions may be formulated to contain the active ingredient in an amount within the range of 0.5 to 80 percent by weight of the composition.

The compounds of this invention may also be mixed with other additives which are also active or toxic with respect to plants. Certain of these additives may be in the form of solids, as represented by sodium chlorate or the borates or in the form of liquids such as tar oil derivatives (creosotes), substituted or unsubstituted phenols, crude oil derivatives such as kerosene, gas oil, fuel oil and the like. The compounds may be formulated with other useful additives such as fertilizers which contain the usual elements of phosphorus, potassium and nitrogen, with or without trace elements such as Fe, Mn, Zn, Mg, Co and Cu.

In accordance with an important feature of this invention, the thiazolylureas or thioureas may be combined to give a synergistic reaction with other known pesticides in the form of fungicides, bactericides, insecticides and herbicides to increase the biological activity. It is possible to formulate the treating composition to contain one or more of the pesticides described having different chemical structures and biological activities and which may be selected from the group consisting of nitrophenols, chlorophenols, chloronitrophenols, halogenated aryloxyalkylcarboxylic acids, phenylalkylcarboxylic acids, halogenated benzoic acids and derivatives thereof such as the corresponding salts, esters, amines, amides and imides, halogenated carbamates, substituted thiocarbamates and thiolocarbamates, esters of dithiocarbamic acid, alkyl isothiocyanates, mono- or disubstituted amides; di-, tri-or tetrasubstituted aralkyl ureas, substituted triazines, aminotriazole, substituted benzothiazole, hydrazides, uracil derivatives, pyridinium salts, quaternary ammonium salts, inorganic herbicides such as bichromates, alkali metal cyanates, $Na_2AsO_3$, $NH_2SO_3NH_4$, etc., as represented by the following specific compounds: pentachlorophenol; dinitrocresol; dinitrobutylphenol; Na 2,4-dichlorophenoxyacetate; Na 2,3,6-trichlorobenzoate; Na monochloro—/or trichloroacetate; isopropyl N-phenylcarbamate; ethyl N,N-dipropylthiolocarbamate; N,N-dimethyldiphenylacetamide; N-phenyl-N',N'-dimethylurea; 2-chloro-2,6-bis(ethylamino)-s-triazine; 3-amino-1,2,4-triazole; 2,6-dichlorobenzonitrile; maleic hydrazide; 2-chlorobenzothiazole; 1,1'-ethylene dibromide; 2,2'-bipyridinium; methyl isothiocyanate.

In accordance with another feature of the invention, modifications can be made of the various formulations to include one or more surface active agents of the anionic, cationic or non-nionic types, as represented by: Na alkylnaphthalenesulfonate, Na cetyl sulfate, Na oleyl sulfate, Na lauryl sulfate, Na N-methyl-N-oleyltaurate, Na oleyl isothionate, Na ligninsulfonate, Na do-decylbenzene-sulfonate, alkanolamides of fatty acids, Na di(2-ethylhexyl)sulfosuccinate, sulfonated monoglycerides from coconut oils, alkyltrimethylammonium chlorides, alkylbenzyldimethylammonium chloride, cetyltrimethylammonium bromide, the methoxysulfonate of oleyldiethylmethylethylenediamine; lauryl polyethylene glycol ether; ethers from polyoxyethylene and alkylphenols, polyethylene glycol stearate, polypropylene glycol stearate, condensation products of polypropylene glycol and ethylene oxide, esters of polyethylene glycol and of tall oil acids, sorbitol monopalmitate, sorbitol monooleate, tris(polyoxyethylene)sorbitol monolaurate, tris(polyoxyethylene)-sorbitol monoolcate; the condensation product of n-dodecyl mercaptan with ethylene oxide.

The following examples of the preparation and use of the compounds of this invention are given by way of illustration, but not by way of limitation:

EXAMPLE 1

Preparation of N-2(5-chlorothiazolyl)-N'-methylurea.

To a thoroughly agitated solution of 9.5 grams of 2-amino-5-chlorothiazole in 35 ml dimethyl sulfoxide (DMSO), 4.3 grams methyl isocyanate is added dropwise with an accompanying rise in temperature to about 56° C. When the addition is finished, the mixture is cooled to 45° C. and maintained at this temperature for about 1 hour by the addition of heat, if necessary. The solvent is distilled off in vacuum and the residue is taken up in 500 ml of boiling acetone in the presence of vegetable charcoal. The warm solution is filtered and white shiny crystals are formed in the filtrate upon cooling.

The dried crystals have a melting point of 271°–271.5° C. The yield of the compound is about 50 percent by weight calculated on the basis of the starting amine. The following in an analysis in percent by weight of the compound produced in accordance with this example as compared to the theoretical compound calculated for $C_5H_6ClN_3OS$:

| Compound of | % C | H | Cl | S |
|---|---|---|---|---|
| Example 1 | 31.83 | 3.19 | 18.39 | 16.70 |
| Calculated | 31.33 | 3.15 | 18.50 | 16.73 |

EXAMPLE 2

Preparation of N-2(5-chloro-4-methylthiazolyl)-N'-phenylurea 5 grams of 2-amino-5-chloro-4-methylthiazole is dissolved in 50 ml of $CH_3CN$. 4.1 grams of phenyl isocyanate is added dropwise at room temperature with an accompanying rise in temperature to 50° C. This temperature is maintained for 2 hours, the mixture is cooled and the precipitate is collected and dried. It is purified by recrystallization from $CH_3CN$ and decolorized in the presence of vegetable charcoal. 6.75 grams of N-2(5-chloro-4-methylthiazolyl)-N'-phenylurea is obtained in the form of a white powder having a melting point of 252° C., providing a yield of about 75 percent by weight. The compound is given the empirical formula of $C_{11}H_{10}ClN_3OS$:

| Compound of | C | H | N | Cl |
|---|---|---|---|---|
| Example 2 | 49.34 | 3.76 | 15.70 | 13.25 |
| Calculated | 49.46 | 3.62 | 15.90 | 13.29 |

EXAMPLE 3

Preparation of N-2(5-methylthiazolyl)-N'-phenylurea

To a suspension of 7 grams of 2-amino-5-methylthiazole in 50 ml of $CH_3CN$, 7.7 grams of phenyl isocyanate is added slowly with an accompanying temperature rise to about 48° C. The amine becomes dissolved during the course of the addition and the solution is maintained at 48° C. for about 20 minutes. In the course of the reaction, an insoluble product is produced until finally the whole mixture stiffens. The mixture is allowed to remain for about 4 hours after which the crystals are separated and dried and washed with $CH_3CN$ and again dried in vacuum. 12.45 grams of N-2(5-methylthiazolyl)-N'-phenylurea is secured in the form of a white crystalline powder having a melting point of 195°–196° C. corresponding to a yield of about 87 percent by weight.

EXAMPLE 4

Preparation of N-2-thiazolyl-N'-phenylurea

The procedure corresponds to that of Example 3 except that 2-aminothiazole is employed instead of the 2-amino-5-methylthiazole. The product N-2-thiazolyl-N'-phenylurea is obtained in the form of a fine white powder having a melting point of about 171° C. which melting point is raised to 173° C. after recrystallization from $CH_3COOH$ of 50 percent strength. The yield of crude product corresponds to about 96 percent. The following is the analysis of the compound as compared to the empirical formula $C_{19}H_9N_3OS$:

| Compound of | C | H | N | S |
|---|---|---|---|---|
| Example 4 | 54.78 | 4.14 | 19.16 | 14.62 |
| Calculated | 54.77 | 3.91 | 19.23 | 14.48 |

EXAMPLE 5

Preparation of N-2-thiazolyl-N'-methylurea.

To a suspension of 10 grams of 2-aminothiazole in 25 ml of $CH_3Cn$, containing two drops of triethylamine, 6 grams of methyl isocyanate is slowly added by pouring. The reaction is slightly exothermic and the temperature rises to about 66° C. At the end of the addition, the mixture is cooled to 50° C. and maintained at this temperature for 1 ¼ hours. The N-2-thiazolyl-N'-methylurea separates in the form of a white crystalline precipitate which is air dried and then dried in vacuum. The yield of crude product, having a melting point of 215° C., is 15.45 grams or about 78 percent. After recrystallization in absolute alcohol at −30° C., the melting point is raised to 218° C. A final product in the form of shiny white needles is obtained in an overall yield of 94 percent. The following is the analysis of the compound N-2-thiazolyl-N'-methylurea produced in accordance with this example as compared to the empirical formula $C_5H_7N_3OS$:

|  | C | H | N | O | S |
|---|---|---|---|---|---|
| Compound of Example 5 | 38.20 | 4.49 | 28.73 | 10.18 | 20.40 |
| Calculated | 37.77 | 4.35 | 28.84 | 10.52 | 20.90 |

EXAMPLE 6

Preparation of N-2-(5-thiocyanato)thiazolyl-N'-methylurea 580 ml of $CH_3CN$ is warmed to 80° C. and 33.6 grams of 2-amino-5-thiocyanatothiazole is dissolved therein. 17.1 grams of methyl isocyanate is added with constant stirring and the stirring is continued while the mixture is maintained at 80° C. for 8 hours.

Upon cooling, the substituted urea precipitates in the form of a fine, slightly pinkish powder which is filtered and dried. The crude N-2-(5-thiocyanato)thiazolyl-N'-methylurea has a melting point of 225° C. and is secured in the amount of 38.9 grams or about 86.5 percent yield. Recrystallization in methanol yields a final product in the form of small shiny flakes having a yellow coloration and a melting point of 226° C.

The results of the elemental analysis of the compound as compared to the empirical formula $C_6H_6N_4OS_2$ is set forth in the following table;

|  | C | H | N | S |
|---|---|---|---|---|
| Compound of Example 6 | 33.63 | 2.82 | 26.15 | 29.92 |
| Calculated | 33.42 | 2.74 | 25.96 | 29.90 |

EXAMPLE 7

Preparation of N-2(5-carbethoxy-4-methylthiazolyl)-N'-methylurea

By proceeding in accordance with Example 1 but using as the reagents methyl isocyanate and 2-amino-4-methyl-5-carbethoxy-thiazole, the above compound is obtained having a melting point of 262° C. after recrystallization from absolute ethyl alcohol, corresponding to a yield of about 75.5 percent. The analysis of the compound produced furnished the following values compared to the empirical formula $C_9H_{13}N_3O_3S$:

|  | C | H | N | O | S |
|---|---|---|---|---|---|
| Compound of Example 7 | 44.43 | 5.38 | 17.27 | 19.72 | 13.17 |
| Calculated | 44.03 | 4.83 | 17.44 | 19.92 | 13.50 |

EXAMPLE 8

Preparation of N-2(4-methylthiazolyl)-N'-methylurea

The procedure of Example 5 is followed but in which the reagents are methyl isocynate and 2-amino-4-methylthiazole. The above compound is obtained in a yield of 93 percent having a melting point of 212° C. after recrystallization from $CH_3CN$.

The results of the analysis of the compound produced by the example as compared to the empirical formula $C_6H_9N_3OS$ is as follows:

|  | C | H | N | O | S |
|---|---|---|---|---|---|
| Compound of Example 8 | 42.09 | 5.30 | 24.54 | 9.34 | 18.73 |
| Calculated | 41.81 | 5.08 | 24.83 | 9.32 | 18.67 |

EXAMPLE 9

Preparation of N-2(4-trifluoromethylthiazolyl)-N'-methylurea

The procedure is in accordance with Example 6 but in which the reagents are methyl isocyanate and 2-amino-4-trifluoromethylthiazole. The product identified above has a melting point of 254° C. after recrystallization from isopropanol and is obtained in a yield of about 57 percent.

The analysis of the compound produced by this example as compared to the empirical formula $C_6H_6F_3N_3OS$ is set forth in the following table:

|  | C | H | N | F | S |
|---|---|---|---|---|---|
| Compound of Example 9 | 32.00 | 2.69 | 18.66 | 25.31 | 14.24 |
| Calculated | 32.23 | 2.88 | 18.76 | 25.20 | 14.45 |

EXAMPLE 10

Preparation of N-2(4-p-chlorophenylthiazolyl)-N'-methylurea

The procedure is in accordance with Example 5 but the reagents employed are methyl isocyanate and 2-amino-4-(p-chlorophenylthiazole). A yield of 97 percent is obtained of the compound N-2(4-p-chlorophenylthiazolyl)-M'-methylurea, having a melting point of 232.5° C. after recrystallization from acetonitrile.

The analysis of the compound produced as compared to the empirical formula $C_{11}H_{10}ClN_3OS$ is as follows:

|  | C | H | Cl | N | S |
|---|---|---|---|---|---|
| Compound of Example 10 | 49.34 | 3.76 | 13.24 | 15.69 | 11.97 |
| Calculated | 49.16 | 3.64 | 13.30 | 15.52 | 11.96 |

EXAMPLE 11

Preparation of N-2(5-chloro-4-methylthiazolyl)-N'-methylurea

A mixture of 6.1 grams of 2-amino-5-chloro-4-methylthiazole chlorohydrate and 25 ml pyridine is heated to 35°–40° C. 2.1 grams of methyl isocyanate is added over a period of 15 minutes. The mixture is heated with stirring for 3 hours to 50° C. and it is then cooled and rapidly poured over 500 grams of ice. The precipitate formed is filtered and recrystallized from $CH_3CN$. A yield of 75 percent is obtained of the compound N-2(5-chloro-4-methylthiazolyl)-N'-methylurea in the form of a white powder having a melting point of 237° C.

The analysis of the compound as compared to the empirical formula $C_6H_8ClN_3OS$ is as follows:

|  | C | H | N | Cl | S |
|---|---|---|---|---|---|
| Compound of Example 11 | 35.04 | 3.92 | 20.43 | 17.24 | 15.59 |
| Calculated | 35.06 | 3.70 | 20.23 | 17.09 | 15.64 |

EXAMPLE 12

Preparation of N-2(5-chlorothiazolyl)-N'-methylthioures 1.5 grams of methyl isothiocyanate and 2.7 grams of 2-amino-5-chlorothiazole are dissolved in 42 grams pyridine. The solution is heated for 5 hours under reflux and then it is cooled and poured into and excess of water.

The formed precipitate is filtered, thoroughly washed with water and dried. The N-2(5-chlorothiazolyl)-N'-methylthio-urea that is obtained is recrystallized from acetone in the presence of vegetable charcoal to produce the compound which melts at 199° C.

The following is an analysis of the compound as compared to the empirical formula $C_5H_6ClN_3S_2$:

|  | C | H | N | Cl | S |
|---|---|---|---|---|---|
| Compound of Example 12 | 28.91 | 2.91 | 20.23 | 17.06 | 30.87 |
| Calculated | 29.56 | 3.0 | 20.17 | 16.59 | 31.12 |

EXAMPLE 13

Preparation of N-2(5-chloro-4-methylthiazolyl)-N',N'-dimethylurea 38.4 grams of pyridine is mixed with 22.7 grams dimethylcarbamyl chloride and cooled to 5° C. 29.7 grams of 2-amino-5-chloro-4-methylthiazole is added in small increments. The reaction is slightly exothermic so that the temperature rises to about 16° C. The materials are allowed to stand for 1 hour and then heated for 3 hours at 60° C. The mixture is then allowed to cool and poured into 1 liter of ice water with thorough stirring so as to prevent the formation of lumps. the product N-2(5-chloro-4-methylthiazolyl)-N',N'-dimethylurea is separated by filtration and recrystallized from 1.5 liters of $CH_3COOH$ of 50 percent strength. The crystals are washed with water until made neutral and the resulting compound obtained in a yield of 42.5 percent has a melting point of 163° C.

The analysis of the compound as compared to the empiricial formula $C_7H_{10}ClN_3OS$ is as follows:

|  | C | H | Cl | S |
|---|---|---|---|---|
| Compound of Example 13 | 38.26 | 4.59 | 16.15 | 14.59 |
| Calculated | 38.29 | 4.22 | 16.15 | 14.59 |

EXAMPLE 14

Preparation of N-2(4,5-dimethylthiazolyl)-N'-methylurea

By using the method of Example 5 but employing as reagents 2-amino-4,5-dimethylthiazole and methyl isocyanate, the compound N-2(4,5-dimethylthiazolyl)-N'-methylurea is obtained in a yield of 84 percent, having a melting point of 184.5° C. after recrystallization from acetone.

The elemental analysis of the compound as compared to the empirical formula $C_7H_{11}N_3OS$ is as follows:

|  | C | H | N | O |
|---|---|---|---|---|
| Compound of Example 14 | 45.38 | 5.98 | 22.67 | 8.63 |
| Calculated | 45.33 | 5.66 | 22.97 | 8.83 |

EXAMPLES 15–20

Biological experiments and tests were conducted with various greenhouse plants using N-2(5-chlorothiazolyl)-N'-methylurea in four different dosages, as set forth in the following tables, two techniques of treatment were employed, as follows:

a. the pre-emergence treatment, i.e. after seeding but before the plants break through the ground (see tables 1 to 3);

b. the post-emergence treatment, i.e. after the plants have broken through the soil, when each seed has developed into a young plant of between 5 to 15 cm in height (see tables 4 to 6).

The active product was formulated into an aqueous suspension from a wettable powder containing 20 percent by weight of the active compound and applied to the plants by atomization.

The results noted and the evaluations are set forth in the following tables as percent of destruction of the treated vegetation.

TABLE I

Pre-emergence treatment of several plants which belong to the graminaceae and were cultivated in a greenhouse, the results and evaluations being made 37 days after treatment:

| Species of treated plants | doses in kg/hectare of active material | | | |
|---|---|---|---|---|
|  | 0.5 | 1 | 2 | 4 |
| Barley (Hordeum distichum) | 0 | 15 | 15 | 100 |
| Indian corn (Zea mays) | 0 | 15 | 20 | 80 |
| Oats (Avena sativa) | 0 | 20 | 100 | 100 |
| Wheat (Triticum vulgare) | 0 | 35 | 100 | 100 |
| Wild oats (Avena fatua) | 5 | 30 | 100 | 100 |
| Wild millet (Echinochloa crusgalli) | 5 | 65 | 98 | 98 |
| Millet (Panicum miliaceum) | 5 | 98 | 100 | 100 |
| Rye-grass (Lolium italicum) | 75 | 98 | 100 | 100 |
| Slender foxtail (Alopecurus agrestis) | 90 | 100 | 100 | 100 |

TABLE 2

Pre-emergence treatment of various plants which are dicotyledoneae and were cultivated in a greenhouse, the evaluations being made 37 days after treatment:

| Species of plant treated | doses of the active material in kg/hectare | | | |
|---|---|---|---|---|
|  | 0.5 | 1 | 2 | 4 |
| Peas (Pisum sativum) | 0 | 0 | 0 | 3 |
| Tomatoes (Solanum esculentum) | 0 | 0 | 0 | 95 |
| Carrots (Daucus carotta) | 15 | 100 | 100 | 100 |
| Linseed (linum usitatissimum) | 20 | 100 | 100 | 100 |
| Buckwheat (Polygonum fagopyrum) | 98 | 98 | 100 | 100 |
| Amaranth (Amaranthus species) | 98 | 100 | 100 | 100 |
| Rape (Brassica napus) | 100 | 100 | 100 | 100 |

In Table 3, the active product is applied in the form of a sludge containing 5 percent by weight of a wettable powder of N-2(5-chlorothiazolyl)-N'-methylurea.

TABLE 3

| Plant species treated | Results after 10 days doses in kg/hectare of active material | | | | Results after 30 days doses in kg/hectare of active material | | | |
|---|---|---|---|---|---|---|---|---|
|  | 10 | 15 | 20 | 30 | 10 | 15 | 20 | 30 |
| Mustard (wild) (Sinapis arvensis) | 80 | 100 | - | 100 | 100 | 100 | 100 | 100 |
| Great nasturtium (Tropaeolum majus, variety Nanum) | 0 | 0 | - | 0 | 0 | 0 | - | 0 |
| Oats (Avena sativa) | 40 | 75 | - | 75 | 100 | 100 | 100 | 100 |

For the great nasturtium, as recognizable from this table, no destruction occured, but a slight phytotoxicity was noted starting with the dosage of 10 kg/hectare of the active material.

Tables 1 to 3 show that N-2(5-chlorothiazolyl)-N'-methylurea has exceptional herbicide effect which can destroy species belonging both to the graminaceae as well as to the dicotyledonea. Thus it is applicable against a wide spectrum of plants. Furthermore, this herbicide enjoys exceptional efficiency because it is able to destroy up to 100 percent of such species such as slender foxtail, rape and buckwheat when employed in dosages as low as 0.5 kg/hectare in the pre-emergence treatment. This compound also exhibits a selective herbicidal action due to an unexpected and remarkable fact. For example, when applied in the dosage of 0.5 kg/hectare, 90 percent of the foxtail is destroyed whereas the wheat remains undamaged. This herbicide shows a good selectivity with respect to peas and tomatoes in pre-emergence treatment, whereas, at the same dosage, other dicotyledoneae such as carrots, linseed and rape are completely destroyed. At dosages of 4 kg/hectare, all of the test plants with the exception of the peas and the great nasturtium, are practically destroyed. Of considerable interest is the fact that the compound can function as a total weed removal agent.

The following tables 4 and 5 present the results of post-emergence treatments of various plants which are, respectively, graminaceae in Table 4 and dicotyledoneae in Table 5. The experiments were undertaken on greenhouse cultures with a wettable powder containing 20 percent of the active ingredient N-2(5-chlorothiazoyl)-N'-methylurea. The evaluations set forth in the tables were made 34 days after treatment.

TABLE 4

| Species of plant treated | Doses per hectare, in kg of active material | | | |
|---|---|---|---|---|
| | 0.5 | 1 | 2 | 4 |
| Wheat | 0 | 0 | 0 | 0 |
| Barley | 0 | 0 | 0 | 0 |
| Wild oats | 0 | 0 | 0 | 10 |
| Oats | 0 | 0 | 0 | 20 |
| Indian corn | 0 | 0 | 0 | 25 |
| Rye grass | 5 | 85 | 90 | 96 |
| Slender foxtail | 10 | 92 | 98 | 98 |
| Wild millet | 80 | 100 | 100 | 100 |

TABLE 5

| Species of plant treated | Doses per hectare, in kg of active material | | | |
|---|---|---|---|---|
| | 0.5 | 1 | 2 | 4 |
| Peas | 0 | 0 | 0 | 0 |
| Rape | 0 | 0 | 0 | 5 |
| Linseed | 5 | 20 | 35 | 70 |
| carrots | 5 | 40 | 80 | 98 |
| Buckwheat | 15 | 60 | 65 | 90 |

TABLE 6

Post-emergence treatment of various plants with aqueous dispersions containing 5% by weight of the active material

| Species of plant treated | doses per hectare in kg of active material | Wild mustard | Great nasturtium | Oats |
|---|---|---|---|---|
| Results after 10 days: | 2.5 | 0 | 0 | 0 |
| | 5 | 0 | 0 | 0 |
| | 10 | 80 | 0 | 15 |
| | 15 | 80 | 0 | 20 |
| | 20 | 80 | - | 20 |
| | 30 | 80 | 0 | 20 |
| Results after one month: | 2.5 | 100 | 0 | 0 |
| | 5 | 100 | 0 | 20 |
| | 10 | 100 | 0 | 95 |
| | 15 | 100 | 0 | 100 |
| | 20 | 100 | - | 100 |
| | 30 | 100 | 0 | 100 |

It will be recognized from the above table that for the great nasturtium no destruction occurs at any of the dosages although a slight phytotoxicity appears with the dosage of 10 kg/hectare of active material.

The results set forth in Tables 4 to 6 indicate that post-emergence treatment with the herbicide destroys 92 percent of the slender foxtail when applied in dosage of 1 kg/hectare and that it is still fully selective in that it does not destroy wheat, barley and wild oats even at twice the dosage. At a dosage of 2.5 kg/hectare, wild mustard is completely destroyed within one month afted treatment whereas oats remains unaffected.

EXAMPLES 21–23

Field experiments were conducted with N-2(5chlorothiazolyl)-N'-methylurea as the active material applied to the plants in the same manner as described in Examples 15–20.

a. Barley in spring

At the stage or development of three leaves, barley is treated by applying 0.75 to 1.25 kg/hectare of active material. The accompanying weeds were represented by goosefoot (Chempodium species) and by wild radish (Raphanus raphanistrum). The effectiveness of weed removal was very good 64 days after treatment.

b. Wheat in autumn

The pre-emergence treatment in dosages of 1.5 kg/hectare was employed and it was noted that after three months the weed-killing effect was selective with respect to wheat. Slender foxtail and wild radish were destroyed substantially completely.

c. With peas

Treatment was made as soon as the plants broke through the ground by application of the active material in dosages of 1 to 2 kg/hectare. The slectivity was perfect in that 45 days after treatment, the herbicidal efficiency was exhibited by the fact that knotweed (polygonum aviculare), black bindweed (Polygonum convulvulus) and goosefoot (Chenopodium species) were completely destroyed without harm to the pea plants.

EXAMPLES 24–27

The biological activity of N-2(5-chloro-4-methylithiazolyl)-N'-methylurea upon various plants in the greenhouse was tested with four different dosages, as indicated in the following tables. Two different treatments were employed, namely, a pre-emergence treatment after the seeding but before the plants broke through the ground, a post-emergence treatment after the plants had broken through the ground and when each plant was present as a young plant (seedling) which was approximately between 5 to 15 cm in height.

The active material was applied by spraying from an aqueous suspension containing 20 percent by weight of the active material as a wettable powder. The results observed are expressed in the following table in percent of destruction of the treated plants.

TABLE 7

Pre-emergence treatment of various plants which are graminaceae, setting forth observations 41 days after treatment

| Species of treated plants | Doses in kg/hectare of active materials | | | |
|---|---|---|---|---|
| | 1 | 2 | 4 | 8 |
| Wheat | 0 | 0 | 0 | 0 |
| Indian corn | 0 | 0 | 0 | 0 |
| Wild Millet | 0 | 0 | 0 | 15 |
| Barley | 0 | 0 | 0 | 70 |
| Oats | 0 | 0 | 10 | 25 |
| Millet | 0 | 0 | 10 | 98 |
| Rye grass | 0 | 20 | 90 | 100 |
| Slender foxtail | 0 | 5 | 55 | 95 |

TABLE 8

Pre-emergence treatment of various dicotyledoneae, observations being made 41 days after treatment

| Species of treated plants | Doses in kg/hectare of active materials | | | |
|---|---|---|---|---|
| | 1 | 2 | 4 | 8 |
| Peas | 0 | 0 | 0 | 0 |
| Green bean (Phaseolus vulgaris) | 0 | 0 | 0 | 0 |
| Tomatoes | 0 | 0 | 0 | 25 |
| Common sunflower (Helianthus annuus) | 0 | 5 | 0 | 35 |
| Buckwheat | 0 | 0 | 5 | 40 |
| Rape | 0 | 0 | 10 | 98 |
| Linseed | 0 | 65 | 100 | 100 |
| Carrots | 0 | 98 | 100 | 100 |

The following tables 9 and 10 set forth the results from post-emergence treatments of various graminaceae in Table 9 and dicotyledoneae in Table 10, in the greenhouse. The results are those observed 42 days after treatment.

TABLE 9

| Species of plants treated | Doses in kg/hectare of active material | | | |
|---|---|---|---|---|
| | 1 | 2 | 4 | 8 |
| Indian corn | 0 | 0 | 0 | 0 |
| Millet | 0 | 0 | 0 | 50 |
| Wild Millet | 0 | 0 | 20 | 30 |
| Oats | 0 | 0 | 30 | 100 |
| Slender foxtail | 0 | 0 | 70 | 90 |
| Barley | 0 | 20 | 50 | 100 |
| Wheat | 0 | 24 | 50 | 98 |
| Italian wild rye grass | 0 | 70 | 95 | 100 |

TABLE 10

| Species of plants treated | Doses in kg/hectare of active material | | | |
|---|---|---|---|---|
| | 1 | 2 | 4 | 8 |
| Peas | 0 | 0 | 0 | 0 |
| Rape | 0 | 0 | 0 | 0 |
| Sunflower | 0 | 0 | 0 | 50 |
| Green beans | 0 | 30 | 40 | 40 |
| Tomatoes | 0 | 30 | 70 | 90 |
| Buckwheat | 60 | 60 | 60 | 80 |
| Linseed | 60 | 60 | 90 | 95 |
| Carrots | 60 | 80 | 90 | 100 |

It will be seen from Tables 7 to 10 that a clearcut activity is achieved both for the pre-emergence as well as for the post-emergence treatments when application is made in dosages between 4 to 8kg/hectare of the active material. In the pre-emergence treatment, a selective weed killing is observed in that wheat, Indian corn, green beans and peas remain undamaged (Tables 7 and 8) whereas the slender foxtail is destroyed in the amounts of 55-95 percent and the Italian wild rye grass in the amounts of 90-100 percent. In the post-emergence treatment, a selective weed killing is obtained without harm to Indian corn and peas (Tables 9 and 10) while foxtail is destroyed in amounts up to 70-90 percent and wild rye grass in amounts up to 95-100 percent.

EXAMPLES 28-33

According to the method used in Examples 15-20, the biological activity of several substituted thiazolylureas which form the subject matter of this invention were tested with respect to plants using a dosage of 8 kg/hectare of active material. Tables 11 and 12 set forth the results obtained, expressed in percent destruction or the treated plants.

TABLE 11

Pre-emergence treatment of various graminaceae in which the results set forth were observed 46 days after treatment

| Examples | 28 | 29 | 30 |
|---|---|---|---|
| Active material tested | N-2(4-methyl-thiazolyl)-N'-methyl urea | N-2(5-chloro-4-methyl thiazolyl)-N',N'-dimethyl urea | N-2(4-trifluoro-methylthiazoyl)-N'-methylurea |
| Species of plants treated | | | |
| indian corn | 0 | 0 | 0 |
| wheat | 0 | 0 | 60 |
| barley | 0 | 0 | 20 |
| oats | 20 | 0 | 90 |
| millet | 0 | 20 | 100 |
| wild Millet | 10 | 80 | 20 |
| wild rye | 20 | 70 | 60 |
| foxtail | 40 | 95 | 98 |

TABLE 12

Pre-emergence treatment of various dicotyledoneae, in which the results were observations made 46 days after treatment

| Examples | 31 | 32 | 33 |
|---|---|---|---|
| Active material tested | N-2(4-methy-thiazolyl)-N'-methyl urea | N-2(5-chloro-4-methyl thiazolyl N',N'-dimethyl urea | N-2(4-trifluorome-thylthiazolyl)-N'-methylurea |
| Species of plant tested | | | |
| Peas | 20 | 0 | 95 |
| green beans | 0 | 0 | 70 |
| Sunflower | 95 | 0 | 100 |
| Tomatoes | 20 | 40 | 100 |
| Buckwheat | 90 | 30 | 100 |
| Rape | 85 | 60 | 100 |
| Linseed | 95 | 95 | 100 |
| Carrots | 98 | 100 | 100 |

Examples 29 and 32 show that treatment is selective in that it does not destroy wheat, Indian corn, oats and barley, green beans, peas and sunflower, whereas destruction is observed of slender foxtail up to 95 percent, Italian wild rye grass up to 70 percent and wild millet up to 80 percent.

The compounds of Examples 30 and 33 show herbicidal activity but without too much selectivity. All of the millet and rape are destroyed and only Indian corn remains fully resistant.

The compounds of Examples 28 and 31 are selective in that wheat, Indian corn, millet, barley and green beans are not destroyed while herbicidal effect in the order of 85 percent is secured with respect to rape.

EXAMPLE 34

Treatment is effected in accordance with Examples 15–20 but at a dosage of 10 kg/hectare, using as the active ingredient N-2-thiazolyl-N'-methylurea. The active ingredient completely destroyed millet in a pre-emergence treatment.

It will be seen from the foregoing that a new series of compounds are provided which have shown marked activity as a herbicide in managing plant growth and in the destruction of undesirable weeds and plants connected with plant growth. The compounds of this invention exhibit an important degree of selectively with respect to their herbicidal activity with various plants and combinations of plants.

It will be understood that changes may be made in the details of formulation and application without departing form the spirit of the invention, especially as defined in the following claims.

We claim:

1. A compound having the formula
wherein X and Y are each selected from the group consisting of halogen, hydrogen, thiocyano, alkoxy carbonyl wherein the alkoxy group contains 1 to 4 carbon atoms, aryl selected from the group consisting of phenyl, naphtyl, benzyl, tolyl and halogenated derivatives thereof, hydroxy alkyl containing 1 to 4 carbon atoms, alkyl containing 1 to 4 carbon atoms and halogen substituted derivatives thereof, with at least one of X and Y being halogen; $R_1$ is selected from the group consisting of hydrogen, alkyl containing 1 to 4 carbon atoms, alkenyl containing 2 to 4 carbon atoms and alkynyl containing 2 to 4 carbon atoms; Z is selected from the group consisting of sulfur and oxygen, and $R_2$ and $R_3$ are each selected from the group consisting of hydrogen, phenyl, tolyl, phenoxy and halogenated derivatives thereof, with not more than one of $R_2$ and $R_3$ being hydrogen.

2. A thiazole derivative as claimed in claim 1 in which the compound is N-2(5-chloro-4-methylthiazolyl)-N'-phenylurea.

* * * * *

UNITED STATES PATENT OFFICE
CERTIFICATE OF CORRECTION

Patent No. 3,755,347            Dated August 28, 1973

Inventor(s) Jean Claude Guillot et al.

It is certified that error appears in the above-identified patent and that said Letters Patent are hereby corrected as shown below:

Column 2, line 43:

change "alide" to halide;

Column 14, Table 11, line 25:

cancel "urea" under Example 28 and add "urea" under Example 29;

Claim 1, line 1, after "formula" add:

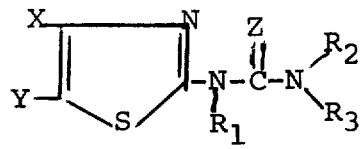

On the cover sheet insert -- 73· Assignee: Produits Chimiques Pechiney-Saint-Gobain, Nevilly-sur-Sein, France --.

Signed and sealed this 2nd day of April 1974.

(SEAL)
Attest:

EDWARD M. FLETCHER, JR.          C. MARSHALL DANN
Attesting Officer                  Commissioner of Patents